United States Patent
Ventola et al.

(10) Patent No.: US 11,667,315 B1
(45) Date of Patent: Jun. 6, 2023

(54) MULTI-STAGE TOY WALKER

(71) Applicant: Skip Hop, Inc., New York, NY (US)

(72) Inventors: Vincent Ventola, Fort Lee, NJ (US); Benjamin Bearsch, Brooklyn, NY (US); Sierra Seip, New York, NY (US)

(73) Assignee: Skip Hop, Inc., New York, NY (US)

( * ) Notice: Subject to any disclaimer, the term of this patent is extended or adjusted under 35 U.S.C. 154(b) by 0 days.

(21) Appl. No.: 17/530,159

(22) Filed: Nov. 18, 2021

(51) Int. Cl.
*B62B 7/00* (2006.01)
*B62B 9/10* (2006.01)
*A63H 33/30* (2006.01)
*A63H 3/52* (2022.01)

(52) U.S. Cl.
CPC ............. *B62B 7/006* (2013.01); *A63H 33/30* (2013.01); *B62B 9/102* (2013.01); *A63H 3/52* (2013.01)

(58) Field of Classification Search
CPC .......... B62B 7/006; B62B 9/102; B62B 7/00; B62B 9/00; A63H 33/30; A63H 3/52; A63H 7/02; A63H 7/04; A63H 7/06; A47D 13/04; A47D 13/043
See application file for complete search history.

(56) References Cited

U.S. PATENT DOCUMENTS

| | | | | |
|---|---|---|---|---|
| 2,872,203 A | * | 2/1959 | Hedstrom | B62B 9/104 297/423.31 |
| 3,330,575 A | * | 7/1967 | Boudreau | B62B 9/26 280/649 |
| 5,265,892 A | * | 11/1993 | Said | B62B 1/20 280/654 |
| 5,362,272 A | * | 11/1994 | Chow | A63H 33/00 280/87.051 |
| 5,544,904 A | * | 8/1996 | Maher | B62B 7/12 280/47.35 |
| 5,788,253 A | | 8/1998 | Thomson et al. | |
| 6,206,384 B1 | * | 3/2001 | Chi | A63H 33/00 280/30 |
| 6,523,840 B1 | * | 2/2003 | Koppes | B62B 3/146 280/47.38 |
| 6,679,506 B2 | * | 1/2004 | Koppes | B62B 3/146 280/47.38 |
| 6,736,415 B1 | * | 5/2004 | Lenihan | B25H 1/12 280/47.38 |
| 2003/0102653 A1 | * | 6/2003 | Koppes | B62B 9/26 280/648 |
| 2006/0071453 A1 | * | 4/2006 | Myers | B62B 9/10 280/652 |

(Continued)

FOREIGN PATENT DOCUMENTS

| | | | |
|---|---|---|---|
| CN | 202874657 A | | 4/2013 |
| CN | 202874657 U | * | 4/2013 |

(Continued)

OTHER PUBLICATIONS

Translated FR-3084869-A1 (Year: 2022).*

(Continued)

*Primary Examiner* — James A Shriver, II
*Assistant Examiner* — Ian Bryce Shelton
(74) *Attorney, Agent, or Firm* — Greenberg Traurig, LLP (57) ABSTRACT

A multi-stage toy walker includes at least a handle, a base, and a configurable component that is adjustable from a folded-flat configuration to at least one of a seat-shaped configuration and a basket-shaped configuration.

19 Claims, 11 Drawing Sheets

(56) References Cited

U.S. PATENT DOCUMENTS

| | | | | |
|---|---|---|---|---|
| 2016/0039448 A1* | 2/2016 | Wang | ........................ | B62B 9/14 |
| | | | | 297/92 |
| 2016/0046314 A1* | 2/2016 | Zehfuss | .................. | B62B 9/104 |
| | | | | 297/354.12 |
| 2019/0135323 A1* | 5/2019 | Avigdor | .................... | B62B 7/12 |

FOREIGN PATENT DOCUMENTS

| | | | | |
|---|---|---|---|---|
| CN | 202874657 U | | 4/2013 | |
| CN | 105584515 A | * | 5/2016 | |
| CN | 105725593 A | * | 7/2016 | ............. A47D 13/04 |
| CN | 108420232 A | * | 8/2018 | ............. A47D 1/002 |
| CN | 111631557 A | * | 9/2020 | ............. A47D 1/006 |
| CN | 213962679 U | | 8/2021 | |
| DE | 102016200811 A1 | * | 7/2016 | ........... B60N 2/2854 |
| FR | 3084869 A1 | * | 2/2020 | ........... B62B 3/1484 |
| FR | 3084869 B1 | * | 11/2020 | ........... B62B 3/1484 |
| GB | 2139883 A | * | 11/1984 | ............. B62B 7/123 |
| GB | 22834333 A | | 10/1995 | |
| GB | 2493364 A | * | 2/2013 | ............... B62B 9/26 |
| KR | 20080003097 U | * | 8/2008 | |
| WO | WO-2011051337 A1 | * | 5/2011 | ............. A47D 13/04 |
| WO | WO-2017153980 A1 | * | 9/2017 | ............. B62B 7/062 |

OTHER PUBLICATIONS

Bright Starts 4-in-1 Shop 'n Cook Walker, https://www.walmart.com/ip/Bright-Starts-4-in-1-Shop-n-Cook-Walker/118701739, 8 pgs.
Weefol, Transformative Wooden Strollers, https://weerol.pl/eng/, 4 pgs.

* cited by examiner

MULTI-STAGE TOY WALKER

BACKGROUND

Conventionally, walkers for children have been relatively fixed and single-purpose products. They are used while a child is growing and unable to walk without assistance. After that point, walkers are no longer of use and are sold, thrown away, or put into storage until the family has another child.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A first aspect of the present disclosure is directed to an example system for a multi-stage walker. The example system includes a base, which includes a first pair of wheels, a second pair of wheels, a support comprising a first support beam and a second support beam, and a crossbar positioned between the first support beam and the second support beam. The example system also includes a handle, which includes a first handle beam coupled to the first support beam, a second handle beam coupled to the second support beam, a handrail extending between the first handle beam and the second handle beam, and a handle support member extending from the first handle beam to the second handle beam. The system further includes a configurable component that has a base panel, a front panel, a first side panel, a second side panel, and a rear panel removably coupled to the handle support member. The configurable component may be adjustable from a seat-shaped configuration to a basket-shaped configuration.

The configurable component may be further adjustable to a folded-flat configuration in which the base panel, the front panel, the first side panel, and the second side panel are each flush with the rear panel.

The rear panel may include a first attachment agent, the front panel may include a second attachment agent, and the first attachment agent and the second attachment agent may be configured to removably couple when the configurable component is in the folded-flat configuration.

The system may further include an activity board, the activity board comprising one or more interactable elements. The activity board may be configured to be coupled to the handle support member when the configurable component is in the folded-flat configuration.

In the seat-shaped configuration, the front panel may be flush with the base panel, each of the front panel and the base panel may be substantially perpendicular to the rear panel and supported by the crossbar, and each of the first side panel and the second side panel may be perpendicular to the rear panel and to the front panel and the base panel.

In the seat-shaped configuration, the system may operate as a stroller.

In the basket-shaped configuration, the base panel may be substantially perpendicular to the rear panel and supported by the crossbar, each of the front panel, the first side panel, and the second side panel may extend perpendicularly from the base panel, and the front panel, the first side panel, the second side panel, the rear panel, and the base panel may form an open-faced rectangular prism.

In the basket-shaped configuration, the system may operate as a push cart.

The configurable component may be made of a soft goods material.

The handle may be adjustable relative to the base, and a relative length of the rear panel may be adjustable in accordance with the handle.

The rear panel may include an end that is configured to removably couple to a portion of the rear panel to form a loop, the loop securing the rear panel to the handle support member.

A second aspect of the present disclosure is directed to an example system for a multi-stage walker. The example system includes a base, which includes a support and a crossbar, and a handle, which includes a handrail, and a handle support member. The example system also includes a configurable component that has a base panel, a front panel, a first side panel, a second side panel, and a rear panel removably coupled to the handle support member. The configurable component may be adjustable from a folded-flat configuration to at least one of a seat-shaped configuration and a basket-shaped configuration.

In the folded-flat configuration, the base panel, the front panel, the first side panel, and the second side panel may be each flush with the rear panel.

In the seat-shaped configuration, the front panel may be flush with the base panel, each of the front panel and the base panel may be substantially perpendicular to the rear panel and supported by the crossbar, and each of the first side panel and the second side panel may be perpendicular to the rear panel and to the front panel and the base panel.

In the basket-shaped configuration, the base panel may be substantially perpendicular to the rear panel and is supported by the crossbar, each of the front panel, the first side panel, and the second side panel may extend perpendicularly from the base panel, and the front panel, the first side panel, the second side panel, the rear panel, and the base panel may form an open-faced rectangular prism.

A third aspect of the present disclosure is directed to an example system for a multi-stage walker. The example system includes a base that includes a first pair of wheels, a second pair of wheels, a support comprising a first support beam and a second support beam, and a crossbar positioned between the first support beam and the second support beam. The example system also includes a handle that includes a first handle beam coupled to the first support beam, a second handle beam coupled to the second support beam, a handrail extending between the first handle beam and the second handle beam, and a handle support member extending from the first handle beam to the second handle beam. The example system further includes a configurable component that has a basket, and a rear panel removably coupled to the handle support member. The handle may be adjustable relative to the base between a first position and a second position, the rear panel may be adjustable from a low configuration to a high configuration, and the low configuration may be associated with the first position and the high configuration is associated with the second position.

In the third aspect, a relative length of the rear panel in the low configuration may be shorter than in the high configuration.

The rear panel may include an end that is configured to removably couple to a portion of the rear panel to form a loop, the loop securing the rear panel to the handle support member.

The loop may include a first loop and a second loop. The end may form a first loop when the rear panel is in a low configuration, and the end may form a second loop when the rear panel is in a low configuration. The first loop may be larger than the second loop.

A size of the basket may be the same regardless of a configuration of the rear panel.

DETAILED DESCRIPTION

Reference will now be made in detail to various embodiments, examples of which are illustrated in the accompanying drawings. While this disclosure includes certain embodiments, it will be understood the disclosure is not intended to limit the claims to these embodiments. On the contrary, the disclosure is intended to cover alternatives, modifications and equivalents, which may be included within the spirit and scope of the claims. Furthermore, in this detailed description, numerous specific details are set forth in order to provide a thorough understanding. However, one of ordinary skill in the art will appreciate that the subject matter of the present disclosure may be practiced without these specific details. In other instances, well known methods, procedures, components, and circuits have not been described in detail as not to unnecessarily obscure aspects of the present disclosure.

The instant disclosure includes a multi-stage walker that can be adjusted or converted into multiple functionalities for a child to play with throughout their life stages. The multiple functionalities may include a stationary activity board, a walking aid, a doll stroller, and a shopping cart, for example. These multiple functionalities may be accomplished, in part, by a configurable component that is structured to fold or otherwise adjust to between configurations. Furthermore, the walker may include an adjustable handle to facilitate use by children of different heights.

Figure 1:
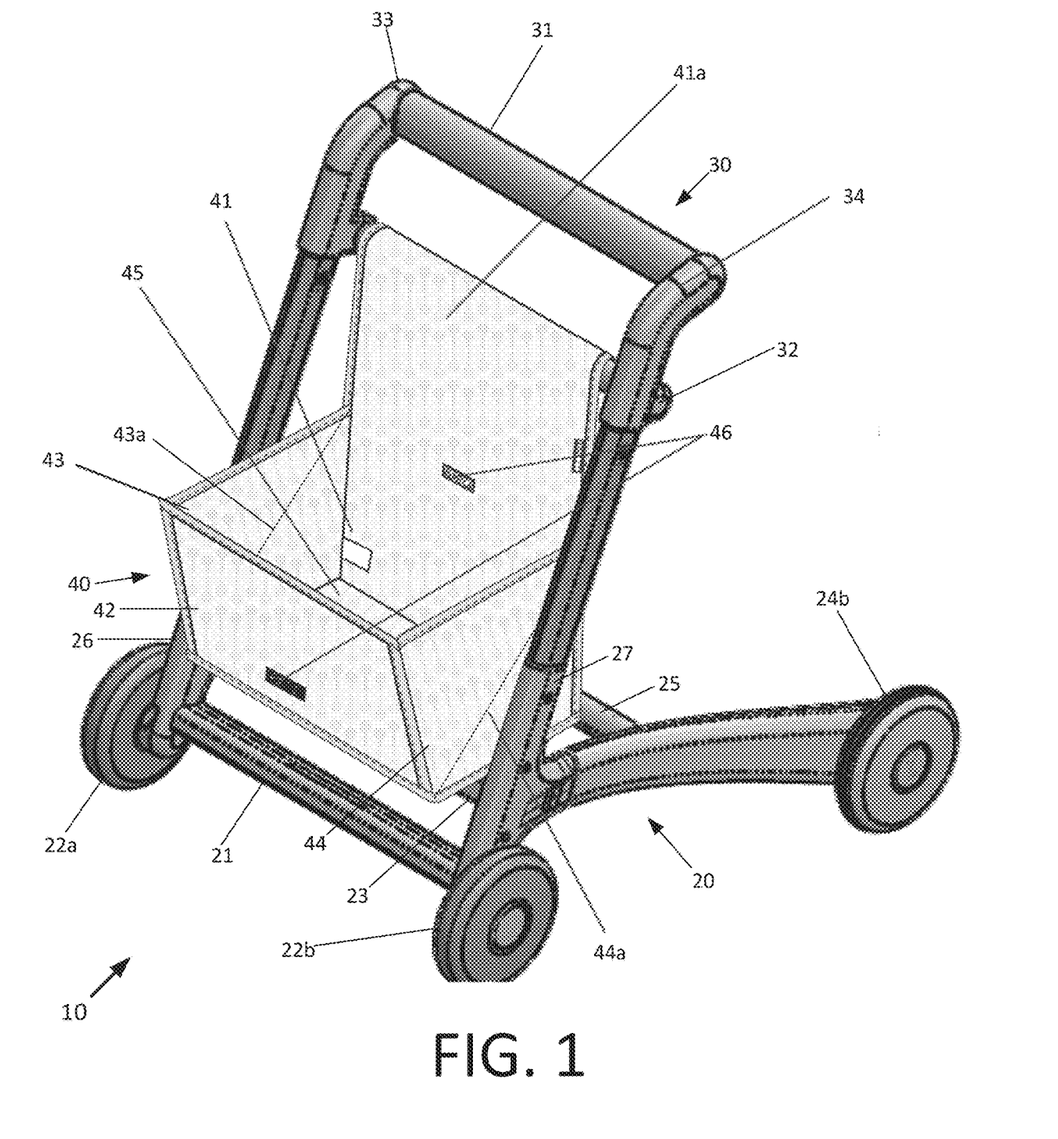
FIG. 1 is a perspective view of an example multi-stage walker in which a configurable component is in a basket-shaped configuration.

FIG. 1 is a perspective view of an example embodiment of a multi-stage walker 10. As shown in FIG. 1, the example multi-stage walker 10 may include a base 20, a handle 30, and a configurable component 40. The base 20 may include a first crossbar 21, a front right wheel 22a and front left wheel 22 (collectively "front wheels 22"), a second crossbar 23, a rear right wheel 24a (not shown) and a rear left wheel 24b (collectively "rear wheels 24"), a third crossbar 25, a right support 26, and a left support 27. The front right wheel 22a and the rear right wheel 24a may each be rotatably coupled to the right support 26, and the front left wheel 22b and the rear left wheel 24b may each be rotatably coupled to the left support 27. Each of the first crossbar 21, the second crossbar 23, and the third crossbar 25 may extend between the left support 26 and right support 27. Taken as a whole, the base 20 may be structured to provide a foundation for the walker 10. In some embodiments, brakes are coupled to one or more of the front wheels 22 and rear wheels 24 in order to selectively prevent movement of the base 20.

The handle 30 may include a handrail 31, a handle support member 32, a right handle beam 33, and a left handle beam 34. Each of the handrail 31 and the handle support member 32 may extend between the right handle beam 33 and left handle beam. The handrail 31 may be structured to receive one or more hands of a user (e.g., a child, toddler, etc.). As such, the handrail 31 may be composed of a soft material, such as a polypropylene (PP), to provide an attractive and intuitive point of contact for a child. The handrail 31 may further be composed of a non-slip material to provide an easily-gripped point of contact. The handle 30 may be coupled to the base 20 via the right handle beam 33 being coupled with the right support 26 and the left handle beam 34 being coupled with the left support 27. In some embodiments, each of the right handle beam 33 and the left handle beam 34 may be configured to fit within the right support 26 and the left support 27, respectively, such that the handle 30 slides relative to the base 20. In these embodiments, a relative length of the handle 30 (and, subsequently, a relative height of the walker 10) may be adjusted by sliding a portion of the handle 30 either into or out of the base 20. This adjustable height functionality is discussed in depth below with regard to FIGS. 9A-11.

The configurable component 40 may include a rear panel 41, a front panel 42, a right panel 43, a left panel 44, and a base panel 45. In some embodiments, the configurable component 40 may be made of (e.g., may include or comprise) a soft-goods material, such as a cloth fabric, an acrylonitrile butadiene styrene (ABS), a thermoplastic elastomer (TPE), or a polyvinyl chloride (PVC), in order to provide a pleasing, comfortable, and durable texture for the user. In those embodiments in which the configurable component 40 is made of a soft-goods material, one or more panels may further include an insert composed of a reinforcing material (e.g., cardboard, polyethylene (PE) board, etc.) in order to reinforce the structural stability of the configurable component 40 without sacrificing texture. In other embodiments, one or more panels of the configurable component 40 are composed of a sturdier material, such as hard plastic or PP. The configurable component 40 may be structured to adjust or fold into multiple shapes and orientations in order to provide multiple functionalities, which may enable the walker 10 to provide multiple utilities for a user throughout a user's life and growth. Furthermore, the configurable component 40 may adjust while remaining attached to the walker 10, which reduces the clutter and number of parts traditionally associated with multi-utility walkers.

In one embodiment, the configurable component 40 may be structured to adjust or fold into three configurations: a basket-shaped configuration, a seat-shaped configuration, and a folded-flat configuration. The configurable component 40 is shown in the basket-shaped configuration in FIG. 1, in the seat-shaped configuration in FIG. 2, and in the folded-flat configuration in FIG. 3. Although only these three configurations are shown in the Figures, other configurations are possible and are within the scope of this disclosure.

As shown in FIG. 1, each of the rear panel 41 and the front panel 42 may feature a fastener patch 46, which can function as an attachment agent when the configurable component 40 is in the folded-flat configuration (described in depth below with regard to FIG. 3). These fastener patches 46 may be tape, glue, hook-and-loop fasteners, child-safe hook tape, or any other material or pair of materials that forms a removably-couplable relationship. The rear panel 41 may further include a rear panel loop 41a that may secure the rear panel 41 (and, in part, the configurable component 40 as a whole) to the walker 10. As described in depth below with regard to FIG. 4, the loop 41a may be adjustable to enable removal of the configurable component 40 from the walker and/or adjustment of a size of the loop 41a to facilitate adjustment of the handle 30.

As discussed, the configurable component 40 is shown in FIG. 1 as being in the basket-shaped configuration. In this configuration, the rear panel 41, front panel 42, right panel 43, and left panel 44 may collectively form four walls of a rectangular prism or box, with the base panel 45 forming a floor of the rectangular prism or box. Put differently, the base panel 45 may extend perpendicularly from the rear panel 41, and each of the right panel 43 and left panel 44 may extend perpendicularly from both the rear panel 41 and the base panel 45. The front panel 42 may extend perpendicularly from the base panel 45 and is parallel to the rear panel 41. In this configuration, the base panel 45 may be supported by the second crossbar 23. As such, the five panels of the configurable component 40 may form an open-faced box or basket. While the configurable component 40 is in the basket-shaped configuration, the walker 10 may be usable as a push cart, shopping cart, movable storage, or similar functionality for a small child or toddler. In some embodiments, inserts may be included within one or more of the five panels to provide rigidity and structure. As discussed above, these inserts may be cardboard or a similar material.

Each of the right panel 43 and the left panel 44 may include a first right fold line 43a and a first left fold line 44a, respectively. These first fold lines, which are illustrated by dashed lines, show the axes upon which the right panel 43 and left panel 44 may be folded when the configurable component 40 transitions from the basket-shaped configuration to the seat-shaped configuration. The first fold lines may be indicated by a stitch mark on the right panel 43 and left panel 44, and may be formed by ironing or otherwise impressing a crease in the material. In those embodiments in which inserts are included in the right panel 43 and left panel 44, the first fold lines may be formed by folds in the inserts. In other embodiments, these first fold lines may be formed by inserting two separate inserts into the panels that form a gap along the first fold lines (e.g., two right triangles).

Figure 2:
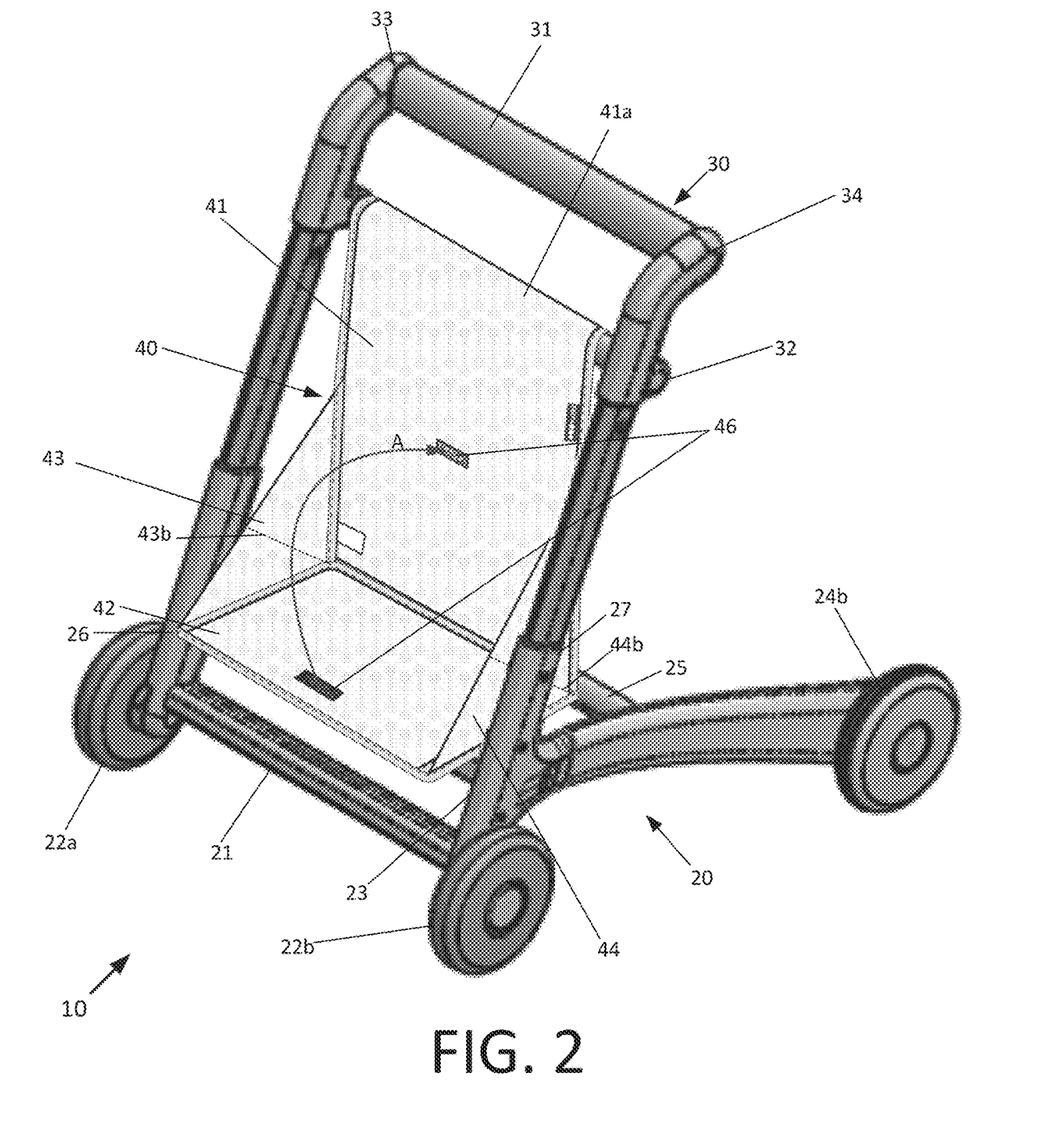
FIG. 2 is a perspective view of the example multi-stage walker of FIG. 1 in which the configurable component is in a seat-shaped configuration.

FIG. 2 is a perspective view of the walker 10 when the configurable component 40 is in the seat-shaped configuration. By folding the right panel 43 along the first right fold line 43a and folding the left panel 44 along the first left fold line 44a, the front panel 42 may be moved flush with the base panel 45 (obscured in FIG. 2). Put differently, the base panel 45 and the front panel 42 may be stacked flush with each other and extend perpendicularly from the rear panel 41. As such, the base panel 45 and the front panel 42 together may form a bottom of a seat and may be supported by the second crossbar 23, the rear panel 41 may form a back of the seat, and the right panel 43 and left panel 44 (which are both now substantially triangular-shaped from the side) each may forms an armrest or sidewall of the seat. While in this seat-shaped configuration then, the panels of the configurable component 40 may form a seat, which may enable the walker 10 to be used as a stroller.

Each of the right panel 43 and the left panel 44 may further include a second right fold line 43b and a second left fold line 44b, respectively. These second fold lines, which are illustrated by dashed lines, show the axes upon which the right panel 43 and left panel 44 are folded when the configurable component 40 transitions from the seat-shaped configuration to the folded-flat configuration. The second fold lines may be indicated by a stitch mark on the right panel 43 and left panel 44, and may be formed by ironing or otherwise impressing a crease in the material. In those embodiments in which inserts are included in the right panel 43 and left panel 44, the second fold lines may be formed by folds in the inserts. In other embodiments, these first fold lines may be formed by inserting two separate inserts into the panels that form a gap along the first fold lines (e.g., two right triangles).

Figure 3:
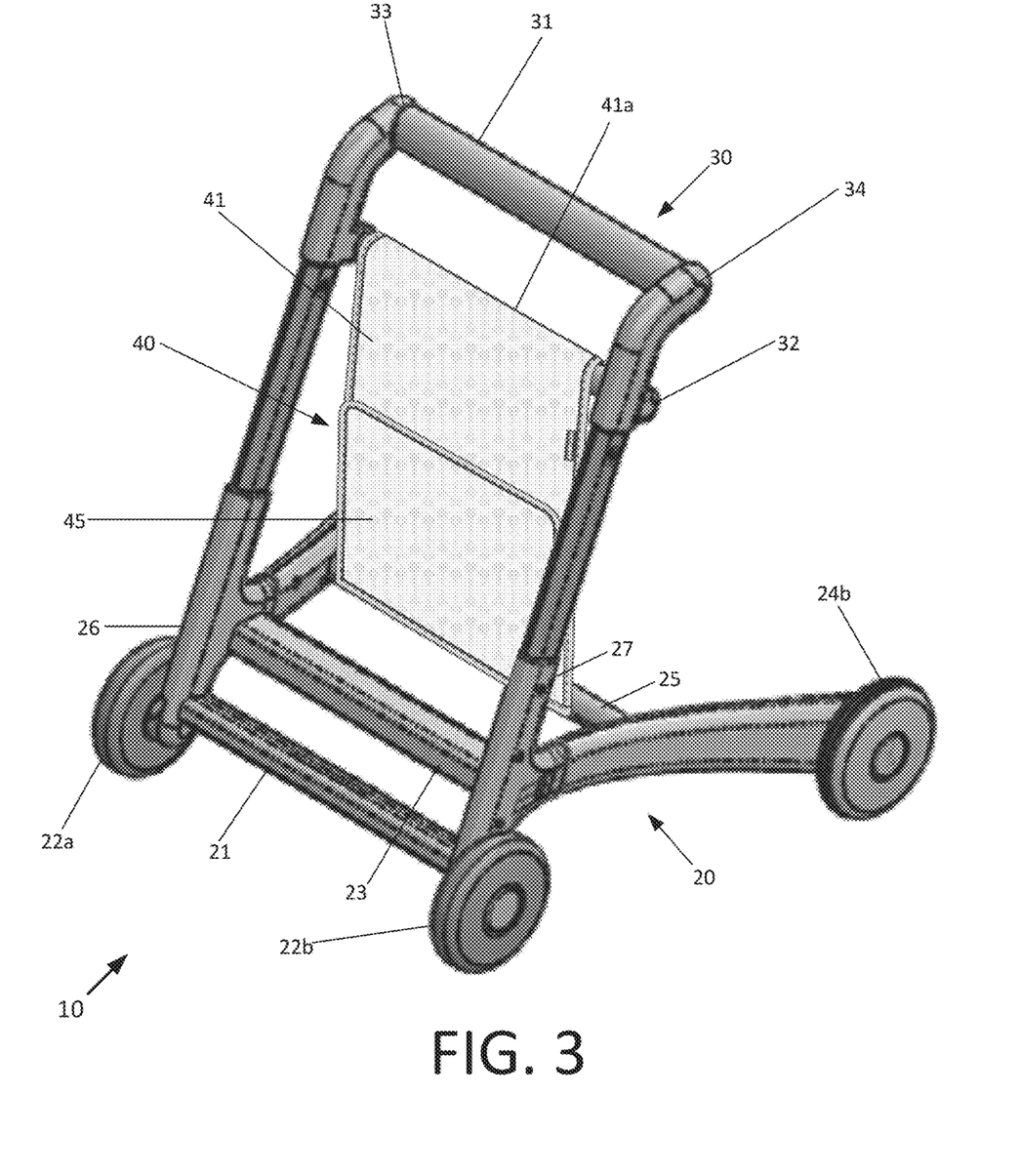
FIG. 3 is a perspective view of the example multi-stage walker of FIG. 1 in which the configurable component is in a folded-flat configuration.

FIG. 3 is a perspective view of the walker 10 with the configurable component 40 in the folded-flat configuration. By folding the right panel 43 along the second right fold line 43b and folding the left panel 44 along the second left fold line 44b, the front panel 42 and the base panel 45 may be moved flush with the rear panel 41 along arrow A (see FIG. 2), and the folded-up right panel 43 and left panel 44 may be tucked between the front panel 42 and the rear panel 41. As such, all five of the panels of the configurable component 40 may be substantially flush with each other, with the rear panel 41 remaining in its initial position. While in this folded-flat configuration, the panels of the configurable component 40 may be substantially compacted and out of the way, which enables attachments to be coupled to the walker 10.

Figure 4:
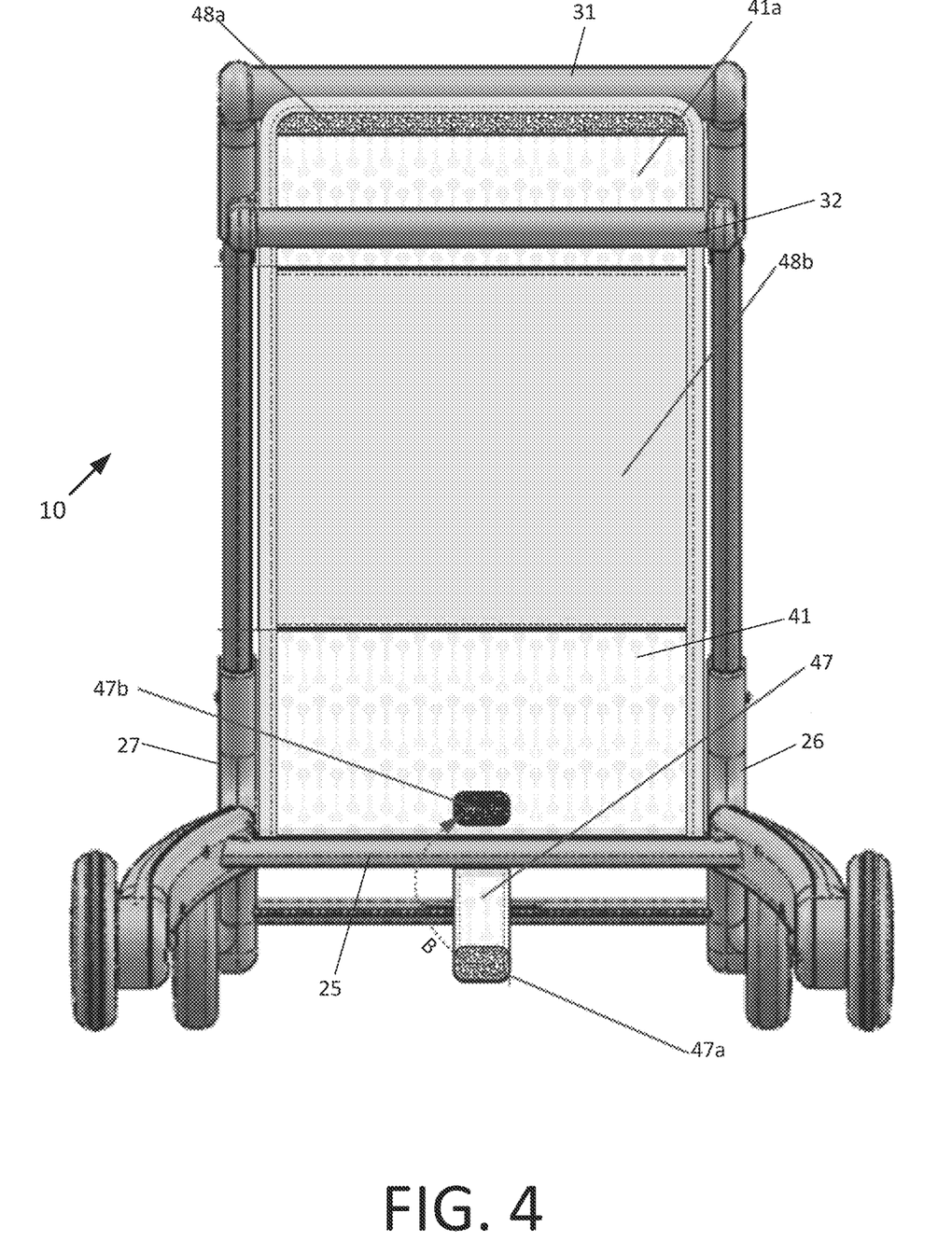
FIG. 4 is a rear view of the example multi-stage walker of FIG. 1.

FIG. 4 is a rear view of the walker 10. As shown in FIG. 4, the rear panel 41 may further include a strap 47, a first strap fastener patch 47a, a second strap fastener patch 47b, a first loop fastener patch 48a, and a second loop fastener patch 48b. One end of the strap 47 may be attached to the rear panel 41 towards the relative bottom of the rear panel (i.e., where the rear panel 41 and the base panel 45 meet), and the first strap fastener patch 47a may be fixed on the opposite end of the strap 47. The second strap fastener patch 47b may be fixed on the rear panel. As shown, the strap 47 may be configured to wrap around the third crossbar 25 in the direction indicated by arrow B, and the first strap adhesive patch 47a may act as an attachment agent with the second strap adhesive patch 47b in order to hold the strap 47 in place about the third crossbar 25. Because the strap 47 may be held in such a position, the relative bottom of the configurable component 40 may be secured to the base 20.

The first loop fastener patch 48a may be fixed to a relative top of the rear panel 41, and the second loop fastener patch 48b may occupy a substantial portion towards a relative middle of the rear panel 41. By wrapping the rear panel 41 about the handle support member 32 and causing the first loop adhesive patch 48a to form an attachment with the second loop adhesive patch 48b, the loop 41a may be formed and the configurable component 40 may be secured to the handle 30. The size of the second loop adhesive patch 48b is such that the loop 41a may be of variable size to accommodate the adjustable handle 30. By causing the first loop adhesive patch 48a and the second loop adhesive patch

48*b* to interact at a point relatively high-up along the second loop adhesive patch 48*b* (i.e., close to the first loop adhesive patch 48*a*), the resultant loop 41*a* may be relatively small. In contrast, if the first loop adhesive patch 48*a* and the second loop adhesive patch 48*b* interact at a point relatively far-down along the second loop adhesive patch 48*b* (i.e., far from the first loop adhesive patch 48*a*), the resultant loop 41*a* may be relatively large. This variable loop size is discussed below in greater depth in FIGS. 10 and 11. Furthermore, although a particular size and shape is shown in FIG. 4 for the second loop adhesive patch 48*b*, other sizes and shapes are contemplated and included within the scope of this disclosure.

Figure 5:
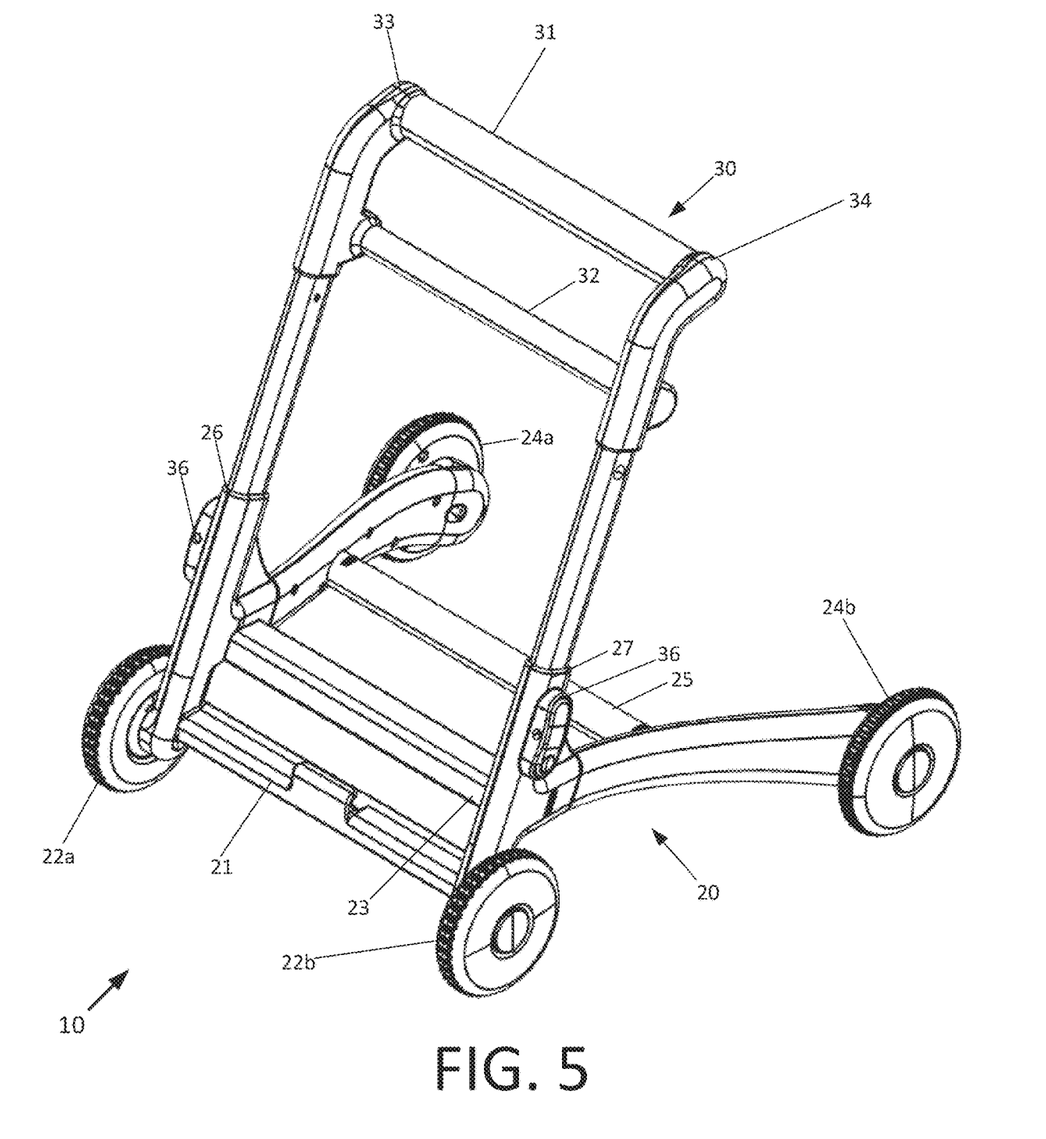
FIG. 5 is a perspective view of the example multi-stage walker of FIG. 1, with the configurable component removed.
Figure 6:
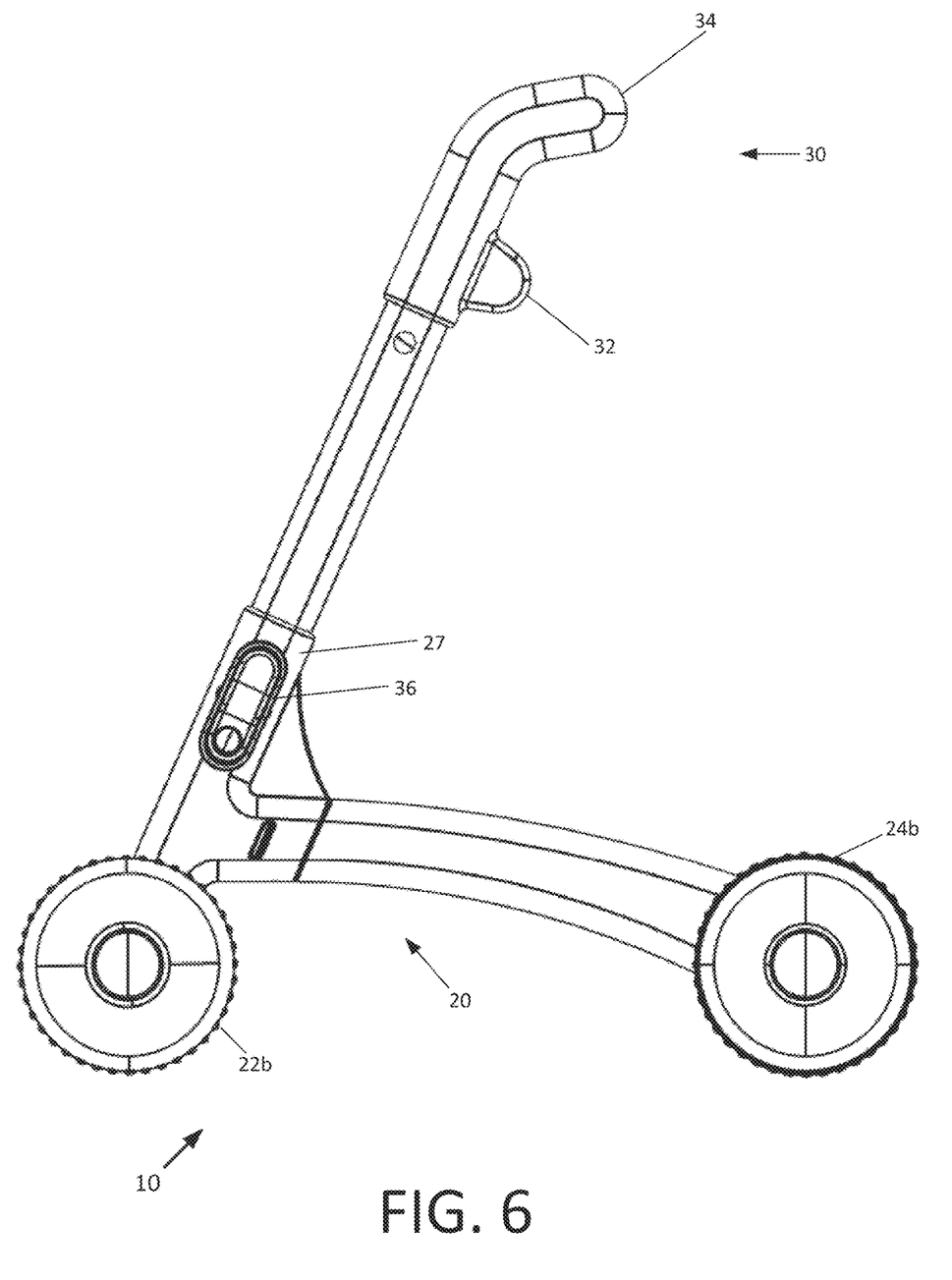
FIG. 6 is a side view of the example multi-stage walker of FIG. 5.
Figure 7:
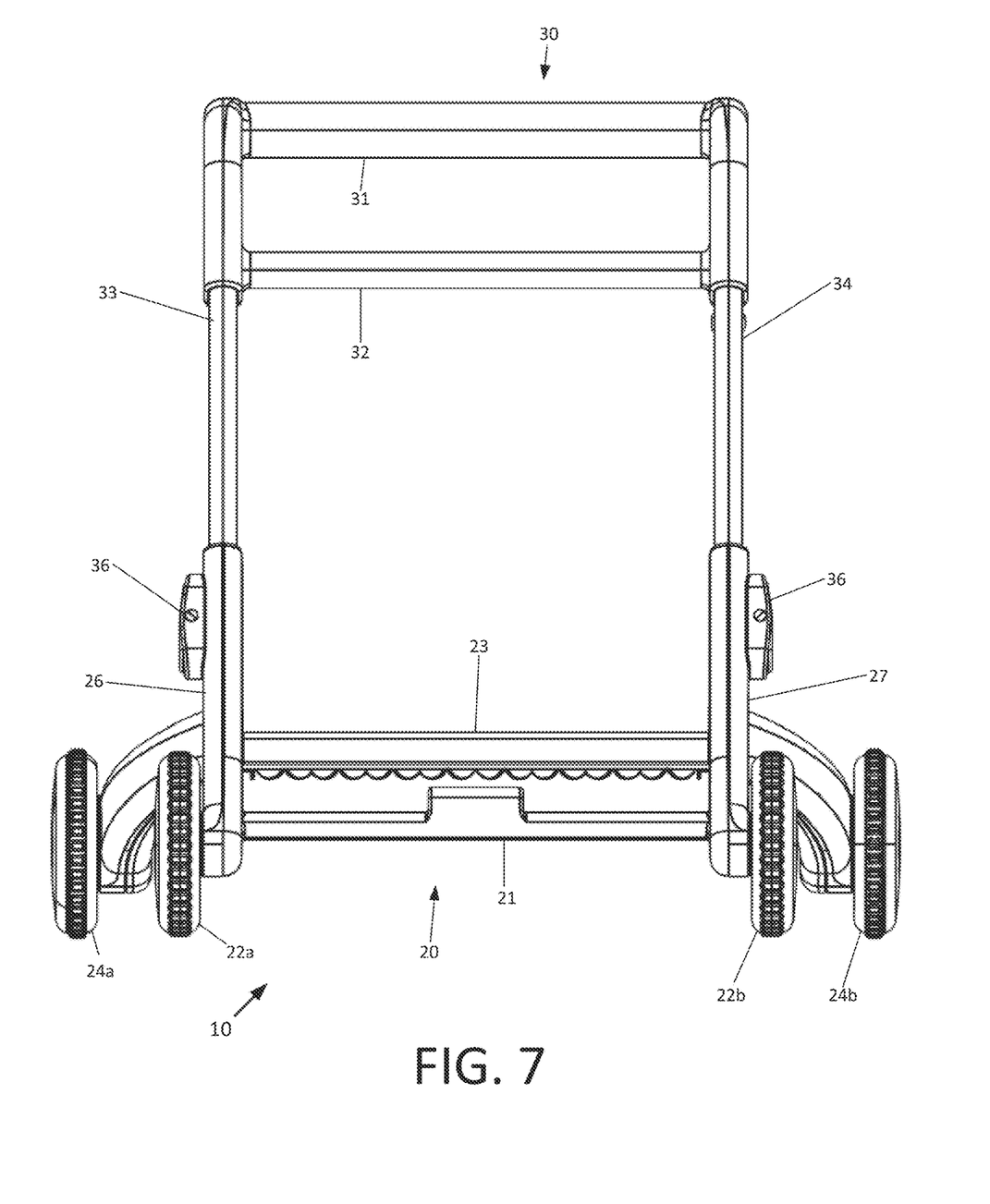
FIG. 7 is a front view of the example multi-stage walker of FIG. 5.

FIGS. 5-7 illustrate the walker 10 without the configurable component 40 to more clearly show the structure of the base 20 and the handle 30. In addition, the embodiment shown in FIG. 5-7 may include a release button 36 on each of the right support 26 and left support 27. As discussed above, in some embodiments, the handle 30 may slide within the base 20 to enable the relative height of the handle 30 to be adjusted. In these embodiments, the release button 36 may be included to selectively prevent or allow movement of the handle 30 within the base 20. The release button 36 may be biased (e.g., by an internal spring) in a locked position, such that movement of the handle 30 may be prevented unless the release button 36 is pressed.

Figure 8:
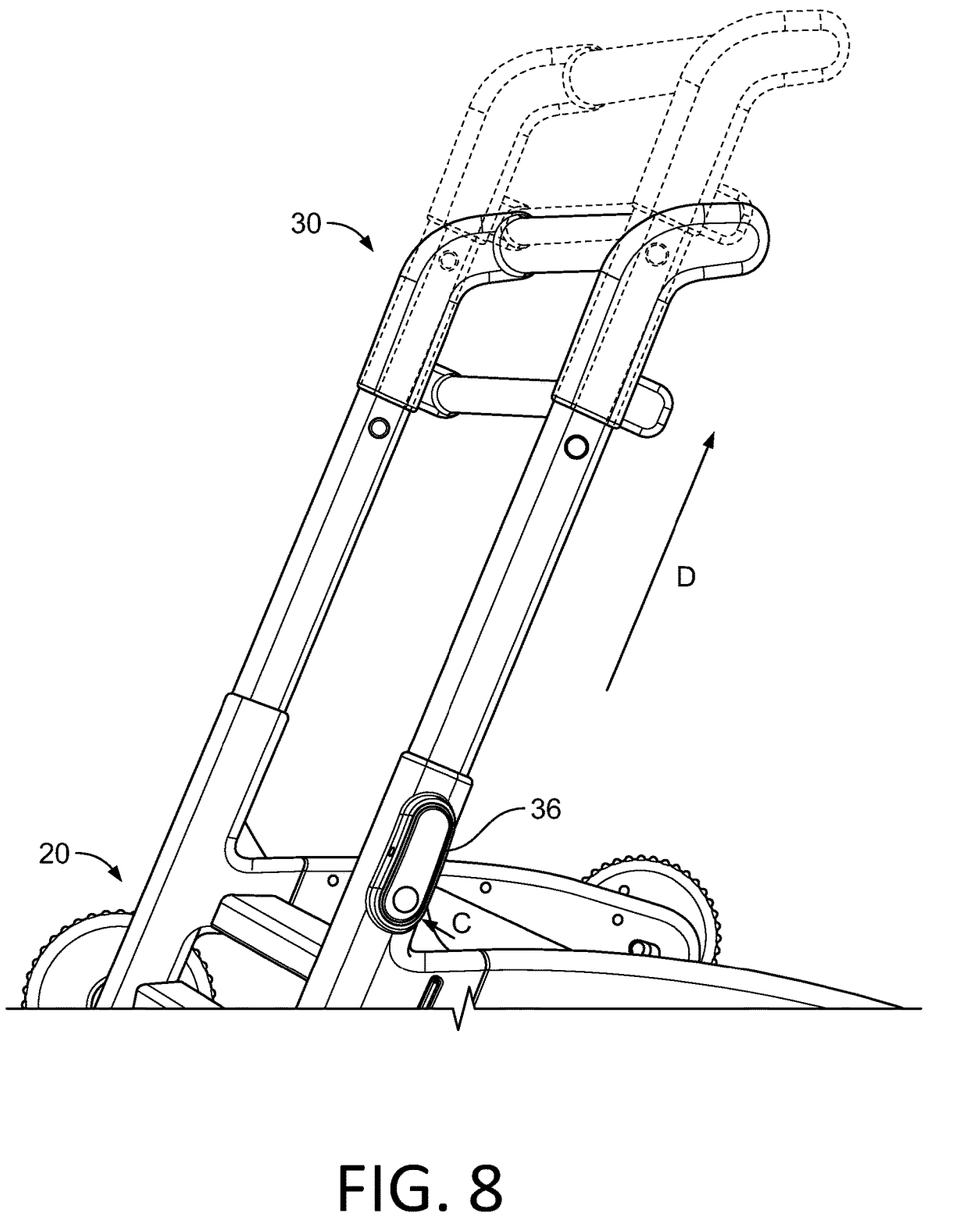
FIG. 8 illustrates an example adjustable handle of the multi-stage walker.

FIG. 8 illustrates the adjustability of the handle 30 of the walker 10. As shown in FIG. 8, when the release button 36 is pressed, which is shown by arrow C, then the handle 30 may be able to move in the direction indicated by the arrow D. In FIG. 8, the handle 30 is shown as solid in a first, low configuration (i.e., before the release button 36 is pressed), and is shown as slightly translucent in a second, high configuration (i.e., after the release button 36 is pressed and the handle 30 is adjusted).

Figure 9A:
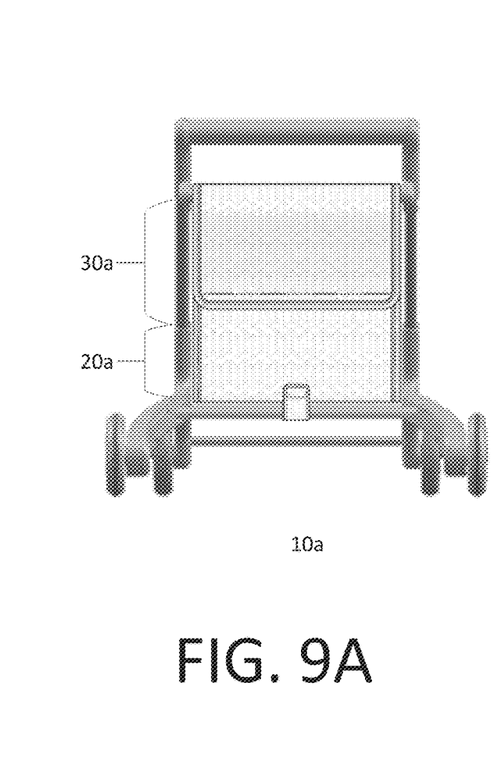
FIGS. 9A-9C are rear views of the example multi-stage walker, illustrating various height configurations of the adjustable handle of the multi-stage walker.
Figure 9B:
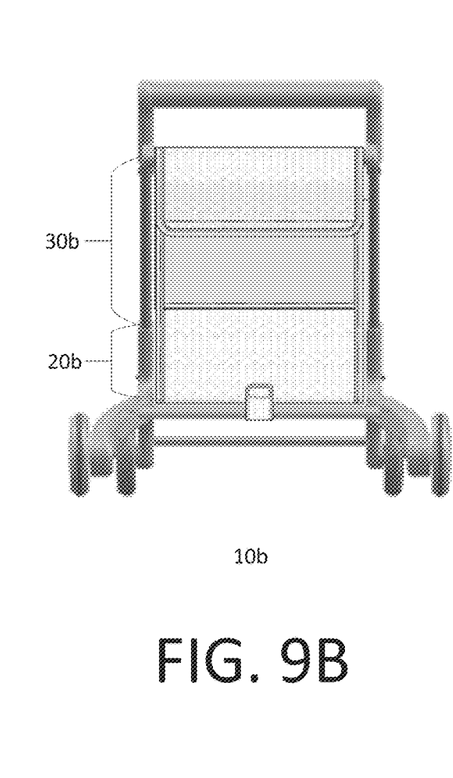
Figure 9C:
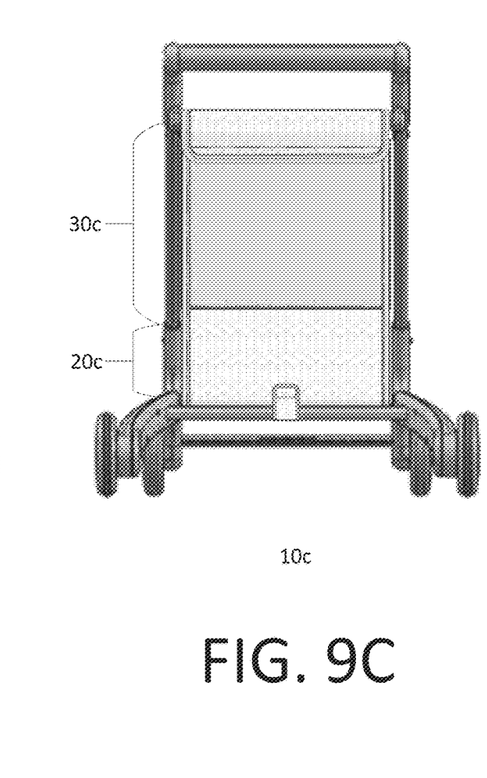

FIGS. 9A-9C and 10A-10C show the walker 10 as the handle 30 is adjusted into different configurations, in accordance with various embodiments of the present invention. The handle 30 of the walker 10 is shown in a low configuration 10*a*, a middle configuration 10*b*, and a high configuration 10*c*. Referring to FIGS. 9A-9C, in the low configuration 10*a*, the base 20 has a relative height of 20*a* and the handle 30 has a relative height of 30*a*. In the middle configuration 10*b*, the base 20 has a relative height of 20*b* and the handle 30 has a relative height of 30*b*. In the high configuration 10*c*, the base 20 has a relative height of 20*c* and the handle 30 has a relative height of 30*c*. As shown, 30*a* may be shorter than 30*b*, while 30*b* may be shorter than 30*c*. In contrast, 20*a* may be equal to 20*b*, which may be equal to 20*c*. As such, the relative length of the handle 30 may increase as the handle 30 adjusts from the low configuration 10*a* to the middle configuration 10*b* to the high configuration 10*c*, while the base 20 may have the same relative height in all configurations.

Figure 10A:
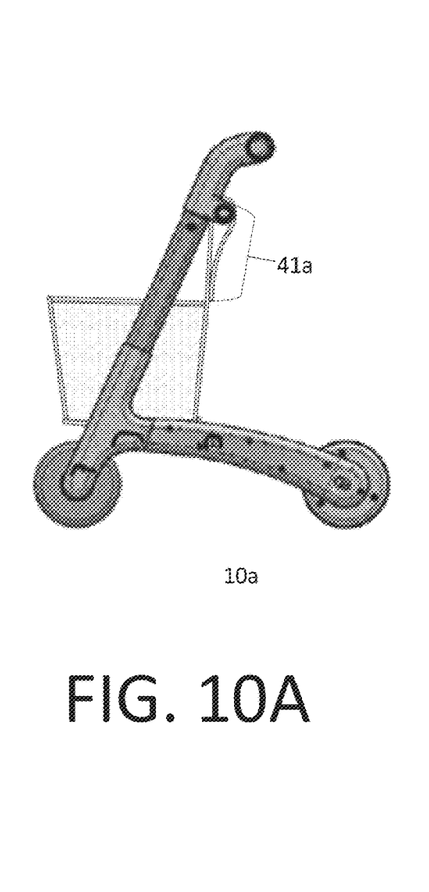
FIGS. 10A-10C are side views of the example multi-stage walker, illustrating various height configurations of the adjustable handle of the multi-stage walker.
Figure 10B:
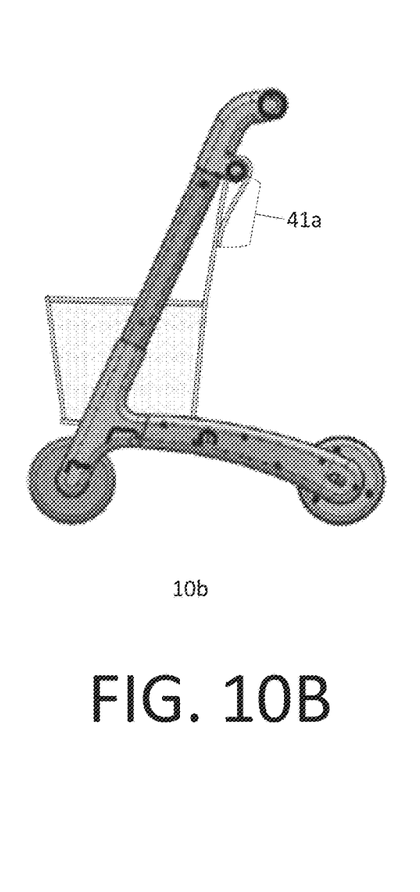
Figure 10C:
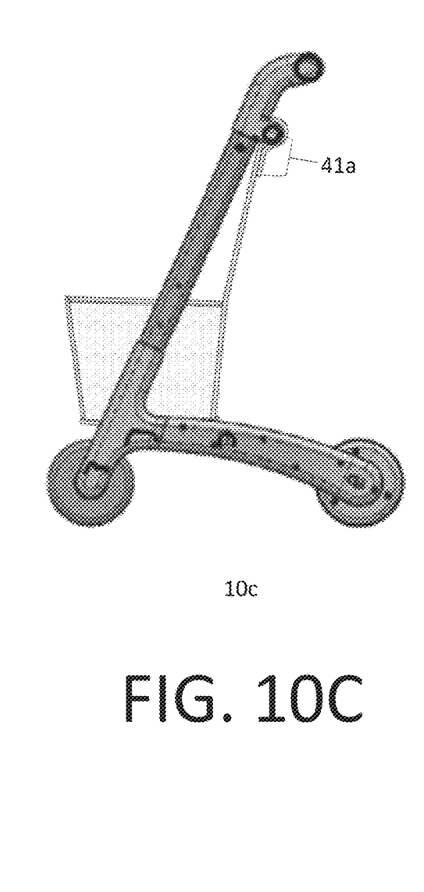

Referring now to FIGS. 10A-10C, a length of the loop 41*a* is shown for each of the low configuration 10*a*, the middle configuration 10*b*, and the high configuration 10*a*. The length of the loop 41*a* is shown as the distance between the point at which the first loop adhesive patch 48*a* interacts with the second loop adhesive patch 48*b* and the handle support member 32. The length or size of the loop 41*a* may be largest in the low configuration 10*a* and smallest in the high configuration 10*c*.

Figure 11:
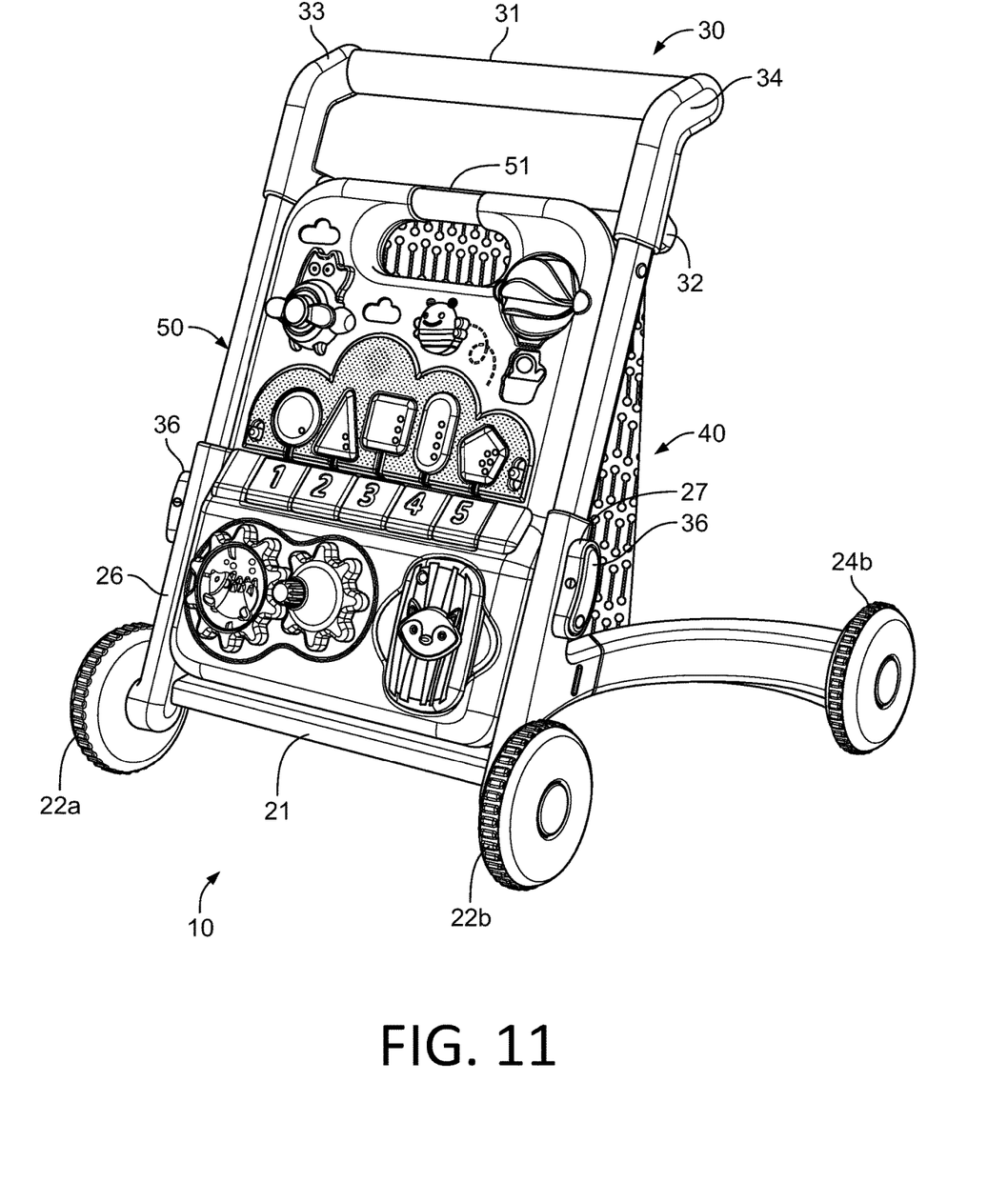
FIG. 11 is a perspective view of the example multi-stage walker with an activity board.

FIG. 11 shows a perspective view of the walker 10 with an activity board 50 attached, in accordance with various embodiments of the present invention. As shown in FIG. 11, the activity board 50 includes one or more interactive elements. Although a particular assortment of interactive elements is shown, the present disclosure should not be read as limited to this particular assortment, and other assortments are included within the scope of this disclosure. The activity board 50 may further include a clip 51 that couples the activity board 50 to the handle support member 32. In the embodiment of FIG. 11, the configurable component 40 is shown in the folded-flat configuration, which may provide space for the activity board 50 to be attached without having to remove the configurable component 40. As such, the configurable component 40 can stay attached to the walker 10 regardless of the desired functionality (e.g., stationary activity board, walker, stroller, shopping cart, etc.) of the walker 10.

Thus, various embodiments provide for a multi-stage toy walker that may be converted from a stationary activity board to a walking aid, stroller, and a shopping cart. As such, the multi-stage toy walker can be used throughout a child's life, from an infant to a toddler that is just learning to walk to a school-aged child playing with dolls. Such a system therefore is both versatile and provides a much longer lifecycle of usage.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for a multi-stage walker, comprising:
   a base comprising:
      a first pair of wheels;
      a second pair of wheels;
      a support comprising a first support beam and a second support beam; and
      a crossbar positioned between the first support beam and the second support beam;
   a handle adjustable relative to the base, the handle comprising:
      a first handle beam coupled to the first support beam;
      a second handle beam coupled to the second support beam;
      a handrail extending between the first handle beam and the second handle beam; and
      a handle support member extending from the first handle beam to the second handle beam; and
   a configurable component comprising:
      a base panel;
      a front panel;
      a first side panel;
      a second side panel; and
      a rear panel removably coupled to the handle support member,
   wherein the configurable component is adjustable from a seat-shaped configuration to a basket-shaped configuration, and
   wherein a relative length of the rear panel is adjustable in accordance with the handle.

2. The system of claim 1, wherein the configurable component is further adjustable to a folded-flat configuration in which the base panel, the front panel, the first side panel, and the second side panel are each flush with the rear panel.

3. The system of claim 2, wherein:
the rear panel comprises a first attachment agent;
the front panel comprises a second attachment agent; and
the first attachment agent and the second attachment agent are configured to removably couple when the configurable component is in the folded-flat configuration.

4. The system of claim 2, further comprising an activity board, the activity board comprising one or more interactable elements,
wherein the activity board is configured to be coupled to the handle support member when the configurable component is in the folded-flat configuration.

5. The system of claim 1, wherein, in the seat-shaped configuration:
the front panel is flush with the base panel;
each of the front panel and the base panel is substantially perpendicular to the rear panel and is supported by the crossbar; and
each of the first side panel and the second side panel is perpendicular to the rear panel and to the front panel and the base panel.

6. The system of claim 5, wherein the system operates as a stroller.

7. The system of claim 1, wherein, in the basket-shaped configuration:
the base panel is substantially perpendicular to the rear panel and is supported by the crossbar;
each of the front panel, the first side panel, and the second side panel extends perpendicularly from the base panel; and
the front panel, the first side panel, the second side panel, the rear panel, and the base panel form an open-faced rectangular prism.

8. The system of claim 7, wherein the system operates as a push cart.

9. The system of claim 1, wherein the configurable component comprises a soft goods material.

10. The system of claim 1, wherein the rear panel comprises an end that is configured to removably couple to a portion of the rear panel to form a loop, the loop securing the rear panel to the handle support member.

11. A system for a multi-stage walker, comprising:
a base comprising:
a support; and
a crossbar;
a handle adjustable relative to the base, the handle comprising:
a handrail; and
a handle support member; and
a configurable component comprising:
a base panel;
a front panel;
a first side panel;
a second side panel; and
a rear panel removably coupled to the handle support member,
wherein the configurable component is adjustable from a folded-flat configuration to at least one of a seat-shaped configuration and a basket-shaped configuration, and
wherein a relative length of the rear panel is adjustable in accordance with the handle.

12. The system of claim 11, wherein, in the folded-flat configuration, the base panel, the front panel, the first side panel, and the second side panel are each flush with the rear panel.

13. The system of claim 11, wherein, in the seat-shaped configuration:
the front panel is flush with the base panel;
each of the front panel and the base panel is substantially perpendicular to the rear panel and is supported by the crossbar; and
each of the first side panel and the second side panel is perpendicular to the rear panel and to the front panel and the base panel.

14. The system of claim 11, wherein, in the basket-shaped configuration:
the base panel is substantially perpendicular to the rear panel and is supported by the crossbar;
each of the front panel, the first side panel, and the second side panel extends perpendicularly from the base panel; and
the front panel, the first side panel, the second side panel, the rear panel, and the base panel form an open-faced rectangular prism.

15. A system for a multi-stage walker, comprising:
a base comprising:
a first pair of wheels;
a second pair of wheels;
a support comprising a first support beam and a second support beam; and
a crossbar positioned between the first support beam and the second support beam;
a handle comprising:
a first handle beam coupled to the first support beam;
a second handle beam coupled to the second support beam;
a handrail extending between the first handle beam and the second handle beam; and
a handle support member extending from the first handle beam to the second handle beam; and
a configurable component comprising:
a basket; and
a rear panel removably coupled to the handle support member,
wherein:
the handle is adjustable relative to the base between a first position and a second position;
the rear panel is adjustable from a low configuration to a high configuration; and
the low configuration is associated with the first position and the high configuration is associated with the second position.

16. The system of claim 15, wherein a relative length of the rear panel in the low configuration is shorter than in the high configuration.

17. The system of claim 15, wherein the rear panel comprises an end that is configured to removably couple to a portion of the rear panel to form a loop, the loop securing the rear panel to the handle support member.

18. The system of claim 17, the loop comprising a first loop and a second loop, wherein:
the end forms the first loop when the rear panel is in the low configuration;
the end forms the second loop when the rear panel is in the high configuration; and
the first loop is larger than the second loop.

19. The system of claim 15, wherein a size of the basket is the same regardless of a configuration of the rear panel.

* * * * *